ature Patent [19]

United States Patent [19]

Carey

[11] 4,069,202

[45] Jan. 17, 1978

[54] CURABLE POLYEPOXIDE CASTING COMPOSITIONS

[75] Inventor: James E. Carey, Mantua, N.J.

[73] Assignee: Shell Oil Company, Houston, Tex.

[21] Appl. No.: 623,523

[22] Filed: Oct. 17, 1975

[51] Int. Cl.$^2$ ............................................. C08G 59/42
[52] U.S. Cl. ............................ 260/47 EC; 260/2 EC;
260/2 EA; 260/18 EP; 260/47 EA; 260/78.41
[58] Field of Search ........... 260/18 EP, 47 EC, 2 EC,
260/47 EA, 2 EA, 78.4 EP

[56] References Cited

U.S. PATENT DOCUMENTS

| | | | |
|---|---|---|---|
| 2,949,441 | 8/1960 | Newey | 260/78.4 |
| 3,301,795 | 1/1967 | Wooster | 260/2 |
| 3,311,589 | 3/1967 | Kohn | 260/47 |

FOREIGN PATENT DOCUMENTS 588,799  12/1959  Canada.

OTHER PUBLICATIONS

Lee et al., "Handbook of Epoxy Resins", McGraw–Hill, New York, 1967, pp. 11–21 and 11–22.
Wiesner, "Hardening Agent for Epoxy Resins", Chem. Abstracts 80, 4364w (1–14–74).

*Primary Examiner*—Harold D. Anderson
*Assistant Examiner*—E. A. Nielsen
*Attorney, Agent, or Firm*—Norris E. Faringer

[57] ABSTRACT

Rapid curing polyepoxide compositions comprise (1) a polyepoxide, and (2) a curing composition comprising (a) a liquid organic dibasic acid and (b) a tertiary amine such as benzyldimethylamine.

4 Claims, No Drawings

CURABLE POLYEPOXIDE CASTING COMPOSITIONS

BACKGROUND OF THE INVENTION

Tertiary amines such as benzyldimethylamine have been utilized both as curing agents for epoxy resins and as catalysts for the anhydride curing of epoxy resins.

It has now been found that when epoxy compounds are cured with a special organic dibasic acid in the presence of tertiary amines the resulting cured resins exhibit a flexible, clear, heterophase composition with unexpectedly good impact resistance and high elongation after yield.

SUMMARY OF THE INVENTION

The present invention is directed to an improved rapid curing epoxy composition comprising (1) a polyepoxide possessing at least one vicinal epoxy group, and (2) curing amount of a curing composition comprising (a) a liquid organic dibasic acid and (b) a tertiary amine.

DESCRIPTION OF THE PREFERRED EMBODIMENT

Epoxy Compounds

The epoxy compounds which may be used are those possessing at least one 1, 2-epoxide group, i.e., a

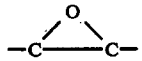

group. They may be monoepoxides or polyepoxides. The monoepoxides may be aliphatic or cycloaliphatic or heterocyclic and may be saturated or unsaturated. They may also be substituted with aromatic rings, ether groups, halogen atoms, ester groups, and the like. Examples of the monoepoxides include, among others, styrene oxide, phenyl glycidyl ether, allyl glycidyl ether, octadecyl glycidyl ether, amyl glycidyl ether, tolyl glycidyl ether, chlorophenyl glycidyl ether, naphthyl glycidyl ether, diacetate of monoglycidyl ether or gylcerol, dipropionate of the monoglycidyl ether of glycerol, diacrylate of the monoglycidyl ether of glycerol, 1,2-hexylene oxide, ethylene oxide, propylene oxide, 1-heptylene oxide, 3-ethyl-1,2-pentylene oxide, glycidyl acetate, glycidyl benzoate, glycidyl propionate, glycidyl acrylate, glycidyl allyl phthalate, glycidyl methyl maleate, glycidyl stearate, glycidyl deate, methyl 1,2-epoxypropionate, butyl 1,2-epoxypropionate, and the like.

The polyepoxides used in the process of the invention comprise those compounds possessing at least one and preferably more than one 1,2-epoxide group. These polyepoxides may be saturated or unsaturated, aliphatic, cycloaliphatic, aromatic or heterocyclic and may be substituted if desired with non-interfering substituents, such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are those preferably having an epoxy equivalency greater than 1.0.

Various examples of polyepoxides that may be used in the invention are given in U.S. Pat. No. 2,633,458 and it is to be understood that so much of the disclosure of that patent relative to examples of polyepoxides is incorporated by reference into this specification.

Other suitable mono and polyepoxides, including ethers and esters are disclosed in U.S. Pat. No. 3,738,862, and so much of the disclosure of that patent relevant to examples of epoxy compounds is incorporated by reference into this specification.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C to 150° C. The heating is continued for several hours to effect the reaction and the product is then washed free of salt and base.

The preparation of suitable glycidyl polyethers of polyhydric phenols as well as examples of other suitable epoxy compounds are described in U.S. Pat. No. 3,219,602, and so much of that disclosure relevant to epoxy resins is incorporated herein by reference.

Organic Polybasic Acid

The organic polybasic acids which may be used in the present compositions include the dibasic acids prepared by the Diels Alder adduction of a long chain polyunsaturated fatty acid such as a $C_{21}$ acid with an alpha-beta-ethylenically unsaturated acid such as acrylic acid, methacrylic acid, crotonic acid, etc.

Suitable dicarboxylic acids are commercially available and have the general formula

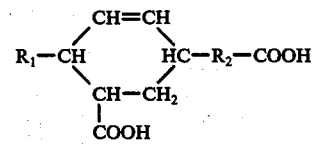

wherein $R_1$ is an alkyl group of up to about 10 carbon atoms and $R_2$ is an alkylene group of up to 12 carbon atoms.

A particularly useful dibasic acid is a liquid $C_{21}$ organic acid having the following type structure:

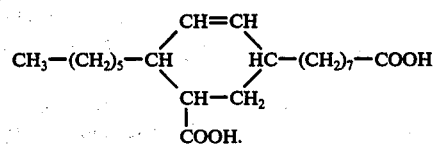

Tertiary Amines

Suitable tertiary amines include the aliphatic tertiary amines and their aromatic substituted derivatives such as triethylamine, benzyldimethylamine, alpha - methylbenzyl dimethylamine, dimethyl amino methyl phenol (DMP-10), and tridimethyl amino methyl phenol (DMP-30).

Under certain circumstances, it may be desirable to utilize a tertiary amine salt such as DMP-30 triacetate, DMP 30 tribenzoate or the tri - 2 - ethyl hexoate salt of DMP-30

A mixture of teriary amines may be employed. Also, the use of other aliphatic and/or aromatic primary and/or secondary amines may be used in small amounts with the instant tertiary amines.

An especially preferred tertiary amine is benzyldimethylamine.

In general, the diacid, polyepoxide and tertiary amine, preferably benzyldimethylamine, are simply reacted together at a temperature of from about 65° C to 125° C and allowed to cure to a tough polymeric product. If desired, benzyldimethylamine (BDMA) may be added to the diacid, which composition remains clear and stable across a wide temperature range. This precatalyzed diacid composition may be subsequently added to the polyepoxide and the composition cured.

Preferably, at least 1 parts by weight (pbw) of tertiary amine is used per 100 parts by weight of the polybasic organic acid (diacid). More preferably, from about 1.5 to 10 pbw of tertiary amine is used per 100 pbw of the diacid.

It has been found that useful, improved polymers are obtained when employing the diacid/BDMA at levels of from about 20 to 80 pbw per 100 pbw of the polyepoxide. Less than about 20 pbw of the diacid/BDMA results in soft, cheesy polymers and more than about 85 pbw of polyepoxide results in polymers with low strength.

Accordingly, the following compositions produce clear, heterophase compositions exhibiting unexpectedly good impact resistance and high elongation after yield and are therefore preferred:

1. 100 parts by weight of polyepoxide
2. 40-60 parts by weight of a catalyzed composition comprising:
   a. 100 parts by weight of an organic dibasic acid, and
   b. 2 to 10 parts by weight of a tertiary amine.

It may be desirable under certain circumstances to employ a co-catalyst such as the organic phosphines, e.g., triphenyl phosphine; the phosphonium halides; stannous salts of monocarboxylic acids, e.g., stannous octoate; amines; acid anhydrides and the like.

Additional materials may also be added for certain applications, including, but not limited to pigments, dyes, stabilizers, plasticizers, fillers, bodying agents, and the like.

To illustrate the instant compositions, the following examples are given. It is to be understood that the examples are for the purpose of illustration only and the invention is not to be regarded as limited to any specific compounds or conditions recited therein. Unless otherwise specified, parts disclosed in the Examples are parts by weight.

EXAMPLE I

This Example illustrates the preparation of seven compositions wherein the ratio of diacid to epoxy resin is varied from 20 to 80 pbw of diacid to 100 pbw of polyepoxide (EPON ® Resin 828 — a diglycidyl polyether of Bisphenol A having an average molecular weight of about 380 and an average equivalent weight of about 180).

1.5 parts by weight of BDMA were added to 100 parts by weight of DIACID ® 1550 (a $C_{21}$ dibasic acid prepared by the Diels Alder adduction of a $C_{18}$ polyunsaturated acid with acrylic acid). Then various amounts of this catalyzed diacid were added to EPON Resin 828 and the composition cured at 100° C for 2 hours. The result of seven experiments is tabulated in Table I.

It will be appreciated from the data in Table I that the best balance of impact resistance and strength results when about 60 pbw of a diacid/BDMA (100:1.5 pbw) composition is used per 100 parts by weight of polyepoxide. Microscopic examination of the resulting clear polymers shows spherical inclusions typical of heterophase systems.

EXAMPLE II

Related physical properties were obtained when 100 parts by weight of EPON ® Resin 828 was cured with the following three curing combinations:

| EXPERIMENT | DIACID ® 1550 | BDMA |
|---|---|---|
| (1) | 100 pbw | 1.5 pbw |
| (2) | 75 pbw | 1.5 pbw |
| (3) | 50 pbw | 1.5 pbw |

EXAMPLE III

The procedures of Example I are repeated using varying amounts of DIACID ® 1550 and BDMA. The results are tabulated in Tables II and III.

TABLE I

| EPON® Resin 828/Diacid-BDMA Castings | 1 | 2 | 3 | 4 |
|---|---|---|---|---|
| EPON Resin 828 | 100 | 100 | 100 | 100 |
| 100 pbw Diacid } 1.5 pbw BDMA | 20 | 30 | 40 | 50 |
| Barcol Hardness | | 0 | 0 | 0 |
| Shore D Hardness | No | 25 | 78 | 79 |
| HDT, ° C | Cure | 0 | 31.5 | 31 |
| R.T. Impact (Unnotched) in-lb | — | — | 2.9 | 2.9 |
| Water Boil 24 Hrs. % Gain | — | — | — | 2.55 |
| Condition After | — | — | Sl.Cloudy | Clear |
| R.T. Tensile Properties (Crosshead Speed 0.05"/Min.) psi | | | | |
| Yld. | | | 5,400 | 6,360 |
| Max. | | | 5,400 | 6,360 |
| Ult. | | | 3,830 | 3,660 |
| % Elong | | | | |
| Yld. | — | — | 3.33 | 3.5 |
| Max. | — | — | 3.33 | 3.5 |
| Ult. | — | — | 70.0 | 35.2 |

TABLE II

| EPON® Resin 828/Diacid-BDMA Castings | 1 | 2 | 3 |
|---|---|---|---|
| EPON Resin 828 | 100 | 100 | 100 |
| 100 pbw Diacid } 3.0 pbw BDMA | 30 | 40 | 50 |
| Barcol Hardness | 6 | 3 | 0 |
| Shore D Hardness | 85 | 84 | 83 |
| HDT, ° C | 45 | 51 | 5.0 |
| R.T. Impact (Unnotched) in-lb | 2.5 | 9.1 | 9.6 |
| Water Boil 24 Hrs. % Gain | 4.1 | 3.0 | 2.5 |
| R.T. Tensile Properties (Crosshead Speed 0.05"/Min.) | | | |
| Yld. | 9,070 | 9,520 | 9,400 |
| Max. | 9,070 | 9,520 | 9,400 |
| Ult. | 5,500 | 6,080 | 5,830 |
| Yld. | 3.6 | 3.8 | 4.0 |
| Max. | 3.6 | 3.8 | 4.0 |
| Ult. | 5.1 | 7.1 | 6.6 |

TABLE III

| EPON® Resin 828/Diacid-BDMA Castings | 1 | 2 | 3 | 4 |
|---|---|---|---|---|
| EPON Resin 828 | 100 | 100 | 100 | 100 |
| 100 pbw Diacid } 6.0 pbw BDMA | 20 | 30 | 40 | 50 |

TABLE III-continued

| EPON® Resin 828/Diacid-BDMA Castings | | | | |
|---|---|---|---|---|
| Barcol Hardness | 3 | 4 | — | — |
| Shore D Hardness | 82 | 83 | 83 | 82 |
| HDT, ° C | 45 | 58 | 59 | 54 |
| R.T. Impact (Unnotched) in-lb | 1.8 | 7.0 | 8.0 | 6.2 |
| Water Boil 24 Hrs. % Gain | 5.5 | 3.5 | 2.8 | 2.5 |
| R.T. Tensile Properties (Crosshead Speed 0.05"/Min.) psi | | | | |
| Yld. | | 10,300 | 9,570 | 9,000 |
| Max. | 9,820 | 10,300 | 9,570 | 9,000 |
| Ult. | 9,820 | 7,330 | 8,100 | 6,870 |
| % Elong | | | | |
| Yld. | | 4.2 | 4.2 | 3.9 |
| Max. | 3.2 | 4.2 | 4.2 | 3.9 |
| Ult. | 3.2 | 7.5 | 5.4 | 4.6 |

| | 5 | 6 | 7 |
|---|---|---|---|
| EPON Resin 828 | 100 | 100 | 100 |
| 100 pbw Diacid } 1.5 pbw BDMA | 60 | 70 | 80 |
| Barcol Hardness | 0 | 0 | 0 |
| Shore D Hardness | 77 | 75 | 68 |
| HDT. ° C | 41 | 28 | 18 |
| R.T. Impact (Unnotched) in-lb | 3.4 | 10.7 | 12.8 |
| Water Boil 24 Hrs. % Gain | 3.0 | 2.7 | 2.58 |
| Condition After | Clear | Sl. Cloudy | Cloudy |
| R.T. Tensile Properties (Crosshead Speed 0.05"/Min.) psi | | | |
| Yld. | 7,670 | 4,150 | 3,780 |
| Max. | 7,670 | 4,150 | 3,780 |
| Ult. | 4,220 | 3,640 | 3,720 |
| % Elong | | | |
| Yld. | 3.9 | 3.9 | 4.4 |
| Max. | 3.9 | 3.9 | — |
| Ult. | 18.0 | 82.1 | 112 |

TABLE IV

| EPON® Resin 828/Diacid-BDMA Castings | | | |
|---|---|---|---|
| | 4 | 5 | 6 |
| EPON Resin 828 | 100 | 100 | 100 |
| 100 pbw Diacid } 6.0 pbw BDMA | 60 | 70 | 80 |
| Barcol Hardness | 0 | 0 | 0 |
| Shore D Hardness | 81 | 80 | 75 |
| HDT, ° C | 48 | 42 | 36 |
| R.T. Impact (Unnotched) in-lb | 10.0 | 11.3 | 15.7 |
| Water Boil 24 Hrs. % Gain | 3.0 | 2.7 | 2.9 |
| R.T. Tensile Properties (Crosshead Speed 0.05"/Min. psi | | | |
| Yld. | 8,330 | 7,730 | 6,180 |
| Max. | 8,330 | 7,730 | 6,180 |
| Ult. | 4,670 | 4,250 | 3,480 |
| % Elong | | | |
| Yld. | 3.8 | 3.9 | 3.9 |
| Max. | 3.8 | 3.9 | 3.9 |
| Ult. | 4.7 | 7.2 | 33.8 |

TABLE V

| EPON® Resin 828/Diacid-BDMA Castings | | | |
|---|---|---|---|
| | 5 | 6 | 7 |
| EPON Resin 828 | 100 | 100 | 100 |
| 100 pbw Diacid } 6.0 pbw BDMA | 60 | 70 | 80 |
| Barcol Hardness | 0 | 0 | 0 |
| Shore D Hardness | 82 | 81 | 75 |
| HDT, ° C | 43 | 38 | 25 |
| R.T. Impact (Unnotched) in-lb | 5.8 | 8.2 | 7.7 |
| Water Boil 24 Hrs. % Gain | 2.9 | 3.0 | 3.2 |
| R.T. Tensile Properties (Crosshead Speed 0.05"/Min. | | | |
| Yld. | 8,200 | 6,070 | 2,760 |
| Max. | 8,200 | 6,070 | 2,760 |
| Ult. | 5,870 | 3,700 | 3,300 |
| Yld. | 3.8 | 3.9 | 4.5 |
| Max. | 3.8 | 3.9 | 110 |
| Ult. | 5.3 | 25.0 | 110 |

EXAMPLE III

Related castings would be obtained if the procedures of Examples I and II were repeated wherein the benzyldimethylamine was replaced with an equivalent amount of tridimethyl amino methyl phenol (DMP-30).

I claim as our invention:

1. A heat-curable composition comprising (1) 100 parts by weight of a polyepoxide processing more than one 1,2-epoxide group and (2) from 20 to 60 parts by weight of a curing composition comprising (a) 100 parts by weight of a liquid organic dicarboxylic acid of the general formula

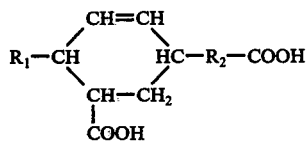

wherein $R_1$ is an alkyl group of up to about 10 carbon atoms and $R_2$ is an alkylene group of up to 12 carbon atoms and (b) from about 2 to 10 parts by weight of a tertiary amine selected from the group consisting of benzyldimethylamine, tridimethyl amino methyl phenols, and salts thereof.

2. A composition of claim 1 wherein the polyepoxide is a glycidyl polyether of 2,2-bis(4-hydroxyphenyl)propane.

3. A composition of claim 1 wherein the organic dicarboxylic acid is a $C_{21}$ organic acid of the general structure:

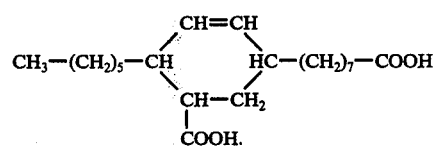

4. A composition as in claim 1 wherein the tertiary amine is benzyldimethylamine.

* * * * *